United States Patent
Ghosh (10) Patent No.: US 10,560,379 B1
(45) Date of Patent: Feb. 11, 2020

(54) ADAPTIVE NETWORK ROUTING

(71) Applicant: Juniper Networks, Inc., Sunnyvale, CA (US)

(72) Inventor: Sandip Kumar Ghosh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 21 days.

(21) Appl. No.: 15/790,531

(22) Filed: Oct. 23, 2017

(51) Int. Cl.
*H04L 12/721* (2013.01)
*H04L 29/12* (2006.01)
*H04L 12/713* (2013.01)
*H04L 12/26* (2006.01)

(52) U.S. Cl.
CPC .......... *H04L 45/70* (2013.01); *H04L 43/0805* (2013.01); *H04L 43/0882* (2013.01); *H04L 43/0888* (2013.01); *H04L 43/0894* (2013.01); *H04L 45/586* (2013.01); *H04L 61/255* (2013.01)

(58) Field of Classification Search
None
See application file for complete search history.

(56) References Cited

U.S. PATENT DOCUMENTS

| | | | |
|---|---|---|---|
| 9,100,274 B1 * | 8/2015 | Ghosh | H04L 49/70 |
| 2012/0201252 A1 * | 8/2012 | Subramanian | H04L 45/125 |
| | | | 370/401 |
| 2012/0236715 A1 * | 9/2012 | Vitt | H04L 47/24 |
| | | | 370/230 |
| 2014/0047098 A1 * | 2/2014 | Rajah | H04L 45/586 |
| | | | 709/224 |
| 2015/0271011 A1 * | 9/2015 | Neginhal, Sr. | H04L 41/0803 |
| | | | 370/254 |
| 2015/0312112 A1 * | 10/2015 | Sung | H04L 41/32 |
| | | | 715/736 |
| 2017/0366467 A1 * | 12/2017 | Martin | H04L 47/6265 |

OTHER PUBLICATIONS

S. Nadas, Ed., "Virtual Router Redundancy Protocol (VRRP) Version 3 for IPv4 and IPv6", Internet Engineering Task Force (IETF), Request for Comments: 5798, Mar. 2010, 40 pages.

* cited by examiner

*Primary Examiner* — Chirag G Shah
*Assistant Examiner* — Srinivasa R Reddivalam
(74) *Attorney, Agent, or Firm* — Harrity & Harrity, LLP (57) ABSTRACT

A network device may determine, based on at least one network egress characteristic associated with a network device, a measure of priority associated with a network address. The network device may provide the measure of priority to a plurality of other routers, determine that a particular network egress characteristic of the at least one network egress characteristic has changed, and update the measure of priority based on the particular network egress characteristic. Based on the updated measure of priority, the network device may perform an action.

20 Claims, 5 Drawing Sheets

ADAPTIVE NETWORK ROUTING

BACKGROUND

A local network, such as a local area network (LAN), is a computer network that interconnects computers or devices within a limited area such as a business location, a school, a residence, a building, and/or the like. A local network may be connected to other networks outside of the local network, such as a Wide Area Network (WAN, e.g., the Internet). In this case, host computing devices operating on the local network may communicate outside of the local network using one or more network devices, such as a routing device.

SUMMARY

According to some possible implementations, a network device may include one or more processors to determine, based on a network egress characteristic associated with the network device, a measure of priority associated with a network address; provide the measure of priority to at least one other network device; determine that the network egress characteristic has changed; update the measure of priority based on the changed network egress characteristic; and perform an action based on the updated measure of priority.

According to some possible implementations, a non-transitory computer-readable medium may store instructions, the instructions comprising: one or more instructions that, when executed by one or more processors, cause the one or more processors to: determine, based on at least one network egress characteristic associated with a network device, a measure of priority associated with a network address; provide the measure of priority to a plurality of other routers; determine that a particular network egress characteristic of the at least one network egress characteristic has changed; update the measure of priority based on the particular network egress characteristic; and perform an action based on the updated measure of priority.

According to some possible implementations, a method may include determining, by a network device and based on a network egress characteristic associated with the network device, a first measure of priority associated with a first network address; providing, by the network device, the first measure of priority to at least one other router; receiving, by the network device and from a first router of the at least one other router, a second measure of priority associated with the first network address; and performing, by the network device, an action based on the first measure of priority and the second measure of priority.

DETAILED DESCRIPTION

The following detailed description of example implementations refers to the accompanying drawings. The same reference numbers in different drawings may identify the same or similar elements.

Local networks often utilize multiple routing devices to enable host computing devices operating on the local network to access a wide area network (WAN) outside of the local network. In a situation where a routing device encounters a problem, it may lead to a loss in WAN connectivity for the host devices that use the routing device to access the WAN. Some networks use technology designed to mitigate problems with routing devices, such as virtual router redundancy protocol (VRRP), which provides dynamic failover in forwarding responsibilities in a situation where a routing device becomes unavailable. However, VRRP and similar technologies that operate on the local area network (LAN) side of a local network do not address problems routing devices may encounter with the WAN interface(s) and/or WAN route(s) used by the routing devices, and problems with the WAN interface(s)/route(s) may cause network traffic sent to the affected routing device to be lost.

Some implementations, described herein, provide a routing device that is capable of determining a measure of priority based on network egress characteristics, including the status of the routing device's WAN interface(s) and/or route(s). The routing device's priority may be communicated to other routing devices (e.g., using VRRP). In a situation where a change in network egress characteristics occurs (e.g., a WAN interface and/or WAN route of the routing device goes down or becomes overly congested), the routing device may update the priority of the routing device and perform a variety of actions based on the change in priority. For example, the change in priority may be communicated to other network devices operating on the network, enabling other routing devices to take responsibility for network traffic that was previously being handled by the routing device.

The ability to adjust priority, of the routing device, based on network egress characteristics of the WAN side of the routing device may enable the routing devices operating on a network to provide improved handling of network traffic, which may lead to a reduction in dropped network traffic in situations where a WAN-side interface and/or route encounters a problem. In addition, the improved network traffic handling may enable more efficient use of network resources by transferring responsibility for forwarding network traffic to routing devices with network egress characteristics that might be better suited to handle the network traffic (e.g., to routing devices with a higher priority based on available WAN interface(s) and/or route(s), available bandwidth of the routing devices, and/or the like).

Figure 1A:
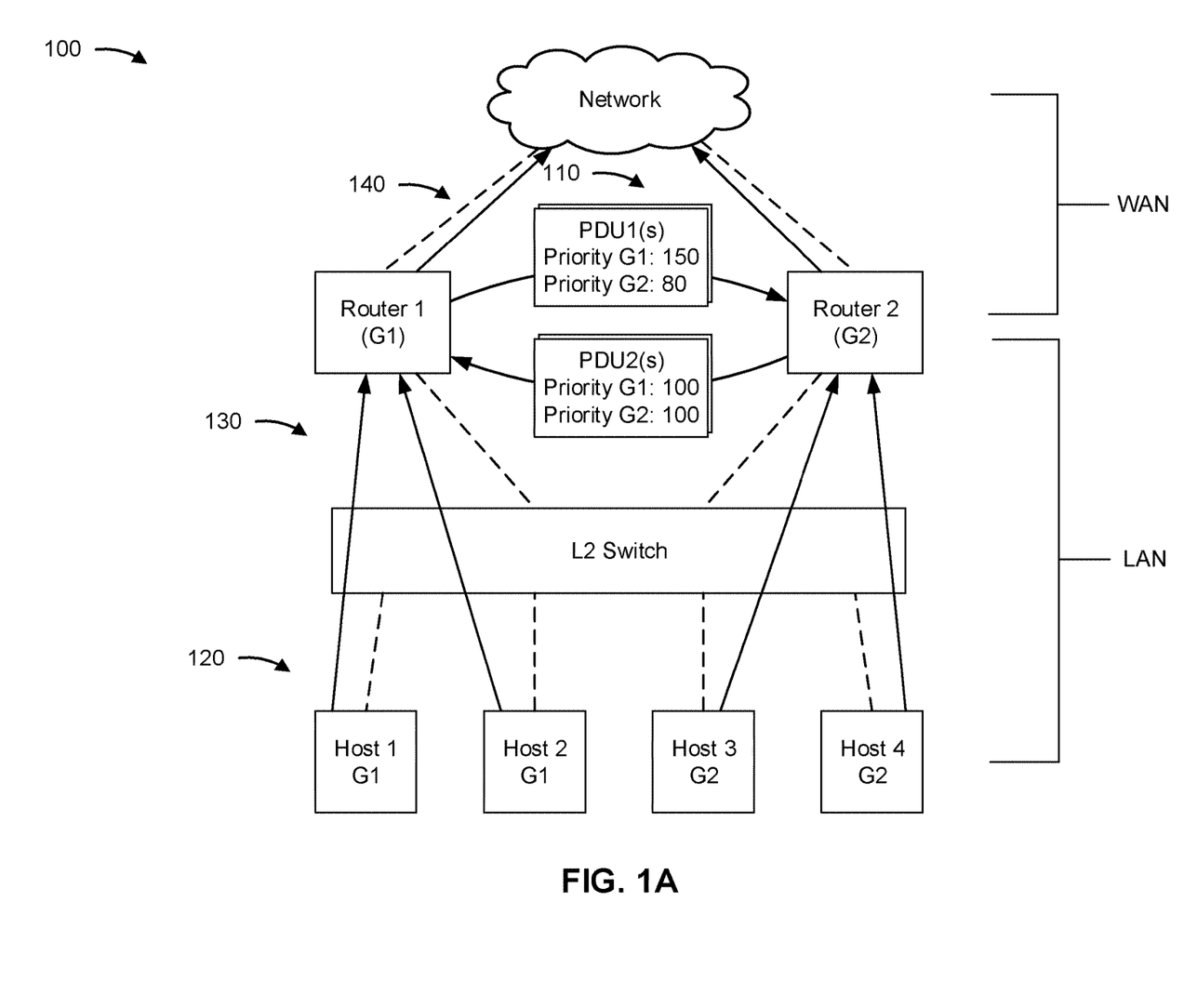
FIGS. 1A and 1B are diagrams of an overview of an example implementation described herein.
Figure 1B:
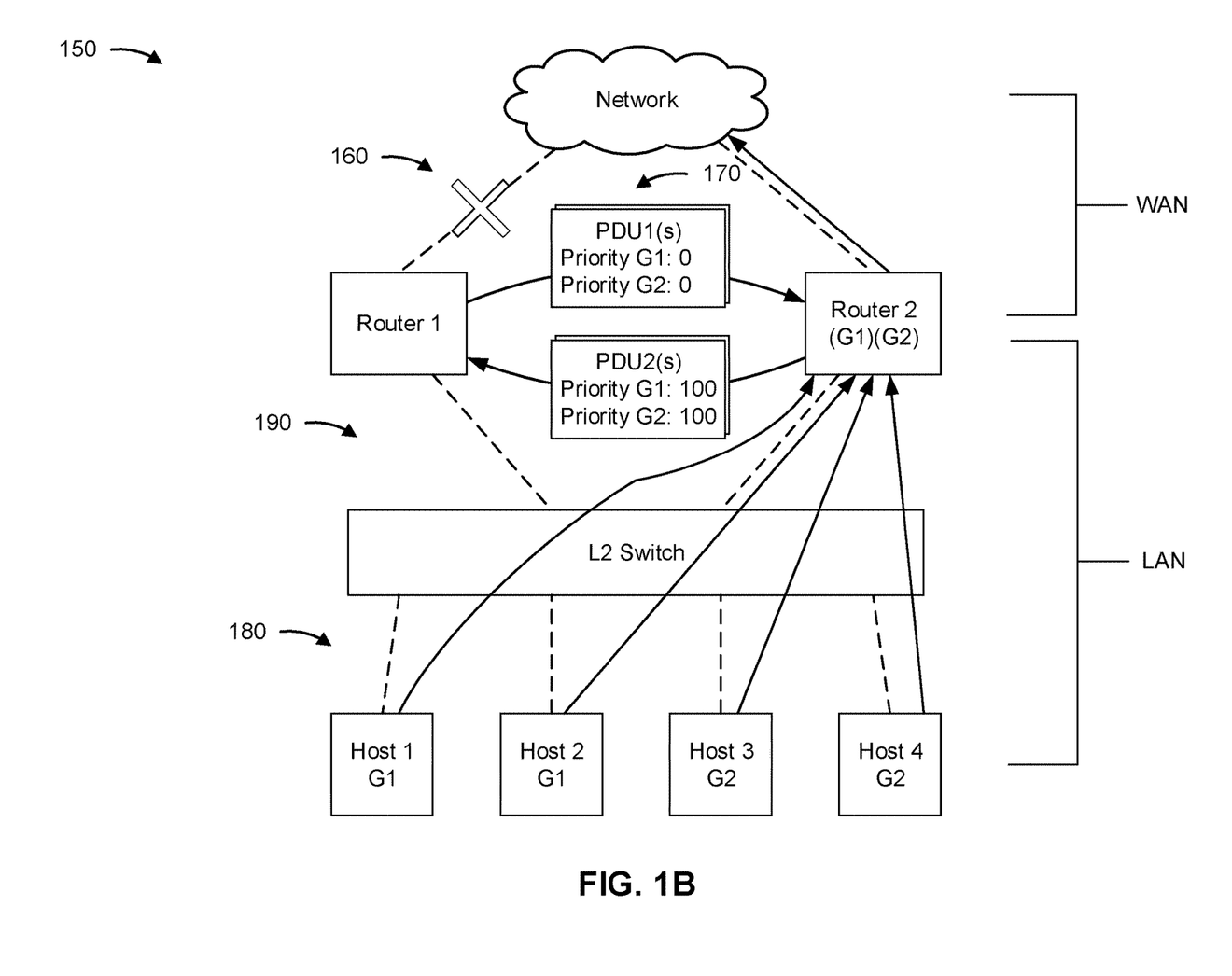

FIGS. 1A and 1B are diagrams of an overview of an example implementations 100 and 150 described herein. As shown in FIGS. 1A and 1B, example implementations 100 and 150 include host computing devices (e.g., Hosts 1 through 4, which may be personal computers and devices that are operating on a LAN), a layer 2 (L2) switch (e.g., a switching device capable of directing LAN network traffic to the appropriate device), and routing devices (e.g., Router 1 and Router 2) for forwarding network traffic from the host devices to a WAN (e.g., the Internet). As shown, two of the example host devices (Host 1 and Host 2) are using a first gateway router internet protocol (IP) address, indicated by G1, as the default gateway address for network traffic leaving the LAN, while the other two example host devices (Host 3 and Host 4) are using a second gateway router IP address, indicated by G2, as the default gateway address.

As shown in FIG. 1A, example implementation 100 shows a first network state based on current priority data. As shown by reference number 110, Router 1 and Router 2 exchange priority data for each virtual gateway IP address (e.g., G1 and G2). For example, the priority data may be included in one or more protocol data units (PDUs) sent using VRRP (e.g., priority data for G1 and G2 may be sent in the same PDU or separate PDUs). Priority may be based on a variety of routing device characteristics, such as whether the routing device is the owner of the gateway IP, network egress characteristics indicating type and quality of WAN interface(s) and/or WAN route(s), and/or the like.

In example implementation 100, based on the priority data, Router 1 assumes a master role for G1, as the priority for G1 (e.g., included in one of the PDU1(s) sent from Router 1) is greater than the priority for G1 (150>100) (e.g., included in one of the PDU2(s) sent from Router 2), and Router 2 assumes a master role for G2, as the priority for G2 (as indicated in one of the PDU2(s) sent from Router 2) is greater than the priority for G2 (100>80) (e.g., included in one of the PDU1(s) sent from Router 1). In this case, network traffic destined for G1 should be handled by the routing device assuming the master role for G1 (Router 1), and network traffic destined for G2 should be handled by the routing device assuming the master role for G2 (Router 2). In some implementations, Router 1 may assume a backup role for G2 while Router 2 may assume a backup role for G1.

As further shown in FIG. 1A, and by reference number 120, host devices transmit network traffic to their corresponding default gateways in a manner designed to enable the routing devices associated with the gateway IP addresses to forward the network traffic through to the WAN. For example, Host 1 and Host 2 use gateway IP address G1 for their network traffic, and Host 3 and Host 4 use gateway IP address G2 for their network traffic. As shown by reference number 130, the L2 switch forwards the network traffic from each of the hosts to the routing device that has assumed the master role for the corresponding gateway IPs. In this example situation, the L2 switch forwards traffic addressed to G1 to Router 1, and forwards traffic addressed to G2 to Router 2. As shown by reference number 140, Router 1 and Router 2 forward the received network traffic to the network (e.g., the WAN/Internet).

As shown in FIG. 1B, example implementation 150 depicts a second network state which is different from the first network state shown in FIG. 1A. For example, as shown by reference number 160, a change in a network egress characteristic has occurred for Router 1. In this example, the WAN egress route has been disabled, or disconnected, indicating that network traffic sent to Router 1 cannot be forwarded to the network.

As further shown in FIG. 1B, and by reference number 170, based on the WAN route being disabled, Router 1 adjusts its priority and communicates the updated priority to Router 2. In this example, the route being down may affect traffic for both G1 and G2, resulting in Router adjusting its priority for both gateway IP addresses (e.g., setting priority to 0 for both G1 and G2 in this example). In this case, Router 2 priority has not changed, and because Router 2 now has a higher priority for G1 (100>0), Router 2 now assumes a master role for G1 while still being master for G2, as Router 2 still has a higher priority for G2 (100>0).

As further shown in FIG. 1B, and by reference number 180, the host devices transmit network traffic to their corresponding default gateways, which are still G1 and G2. As shown by reference number 190, the L2 switch forwards the network traffic from each of the hosts to the routing device that has assumed the master role for the corresponding gateway IP addresses. In this example situation, due to the change in priority and Router 2 assuming the master role for G2, the L2 switch forwards network traffic destined for G1 and G2 to Router 2. In this way, routing devices may use VRRP and WAN egress characteristics to adjust their priority, which may result in assuming and/or relinquishing responsibility for one or more gateway IP addresses. The ability for routing devices to change responsibility for gateway IP addresses based on WAN egress characteristics may increase the reliability of handling layer 3 network communications destined for a WAN, such as the Internet.

As shown in FIGS. 1A and 1B, routing device priority may be adjusted based on network egress characteristics of the WAN side of the routing device, which enables the devices operating on a network to provide improved handling of network traffic, which may lead to a reduction in dropped network traffic in situations where a WAN-side interface and/or route encounters a problem. In addition, the improved network traffic handling may enable more efficient use of network resources by transferring responsibility for forwarding network traffic to routing devices with network egress characteristics that might be better suited to handle the network traffic (e.g., to routing devices with a higher priority based on available WAN interface(s) and/or route(s), available bandwidth of the routing devices, and/or the like).

As indicated above, FIGS. 1A and 1B are provided merely as an example. Other examples are possible and may differ from what was described with regard to FIGS. 1A and 1B.

Figure 2:
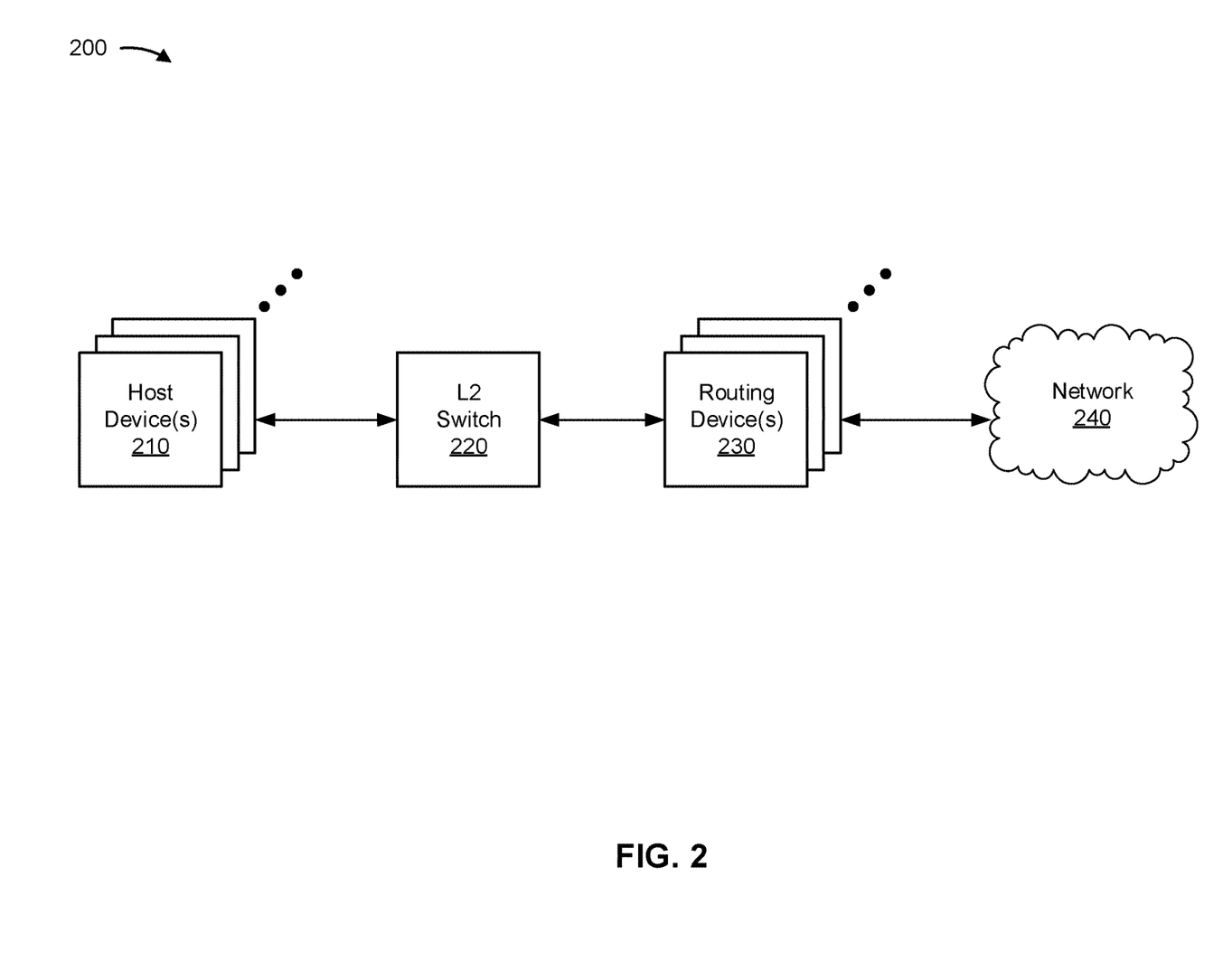
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more host devices 210, a L2 switch 220, one or more routing devices 230, and a network 240. Devices of environment 200 may interconnect via wired connections, wireless connections, or a combination of wired and wireless connections.

Host device(s) 210 includes one or more devices capable of receiving, generating, storing, processing, and/or providing information associated with network communications. For example, host device(s) 210 may include a device, such as a mobile phone (e.g., a smart phone, a radiotelephone, etc.), a laptop computer, a tablet computer, a server computer, a handheld computer, a gaming device, a wearable communication device (e.g., a smart wristwatch, a pair of smart eyeglasses, etc.), or a similar type of device. In some implementations, host device(s) 210 may include hardware or a combination of hardware and software for designating a default gateway for network communications (e.g., a web browsing application may include a field for designating a default gateway that may be used by a network controller of the host device when sending network communications).

L2 Switch 220 includes one or more devices capable of receiving, generating, storing, processing, and/or providing information associated with network communications. For example, L2 switch may include a device (virtual and/or hardware) capable of forwarding network communications within a network. L2 switch may, for example, use network addresses (e.g., media access control (MAC) addresses) and/or tables (e.g., MAC address tables or content addressable memory (CAM) tables), to determine to which device a network packet should be forwarded. L2 switch may, in some implementations, be capable of forwarding network packets received from host device(s) 210 to routing device(s) 230, e.g., using network addresses specified by host device(s) 210 and network addresses provided by routing device(s) 230.

Routing device 230 includes one or more devices capable of receiving, generating, storing, processing, and/or providing information associated with network routing based on priority. Routing device 230 may include a device (virtual and/or hardware) capable of forwarding data packets between computer networks (e.g., forwarding network packets from a LAN to a WAN). In some implementations, routing device 230 includes hardware and/or a combination of hardware and software for performing VRRP communications with other routing devices responsible for forwarding traffic on behalf of LAN devices, such as host device(s) 210.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
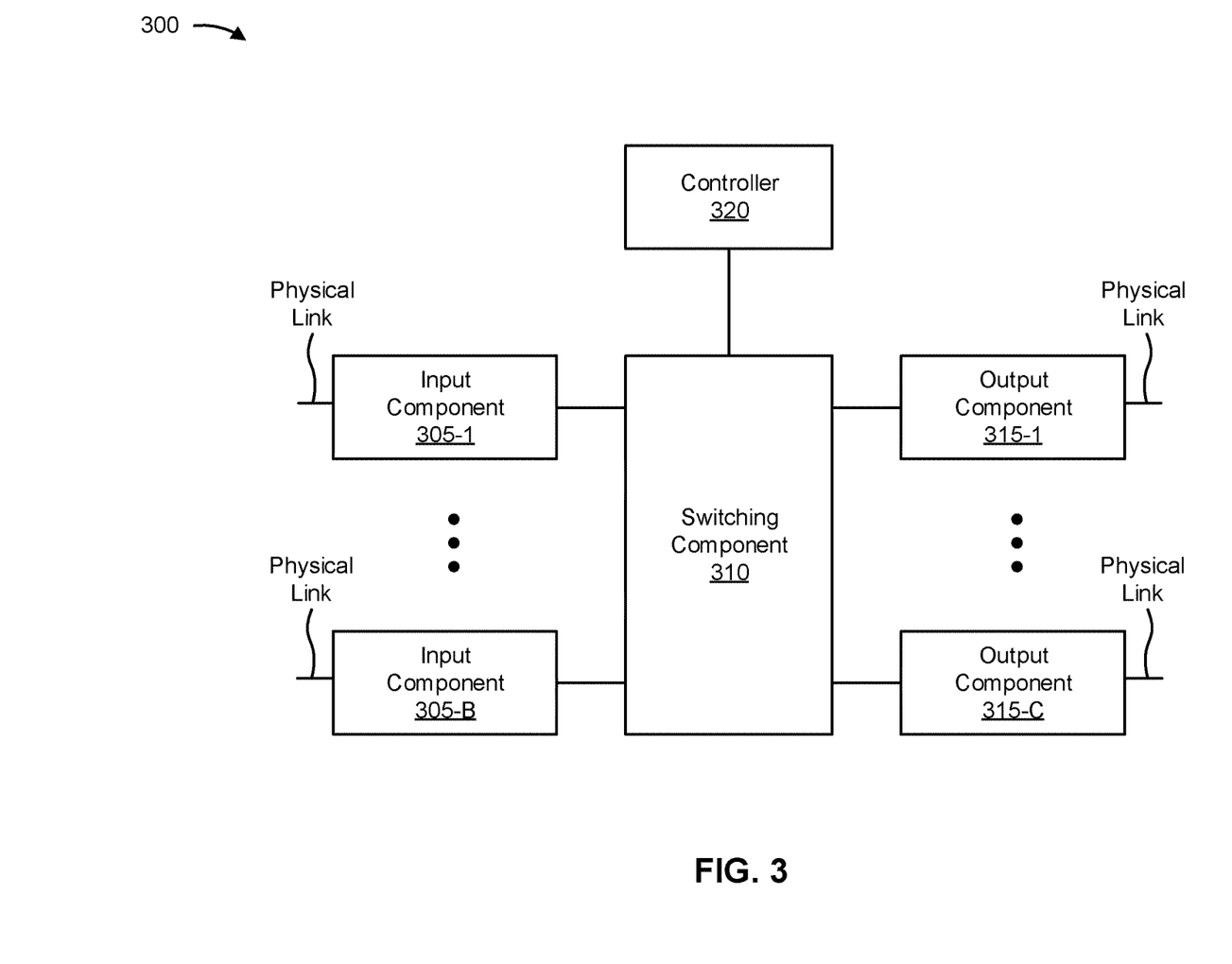
FIG. 3 is a diagram of example components of one or more devices of FIG. 2.

FIG. 3 is a diagram of example components of a device 300. Device 300 may correspond to L2 switch 220, and/or routing device(s) 230. In some implementations, L2 switch 220, and/or routing device(s) 230 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. A processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
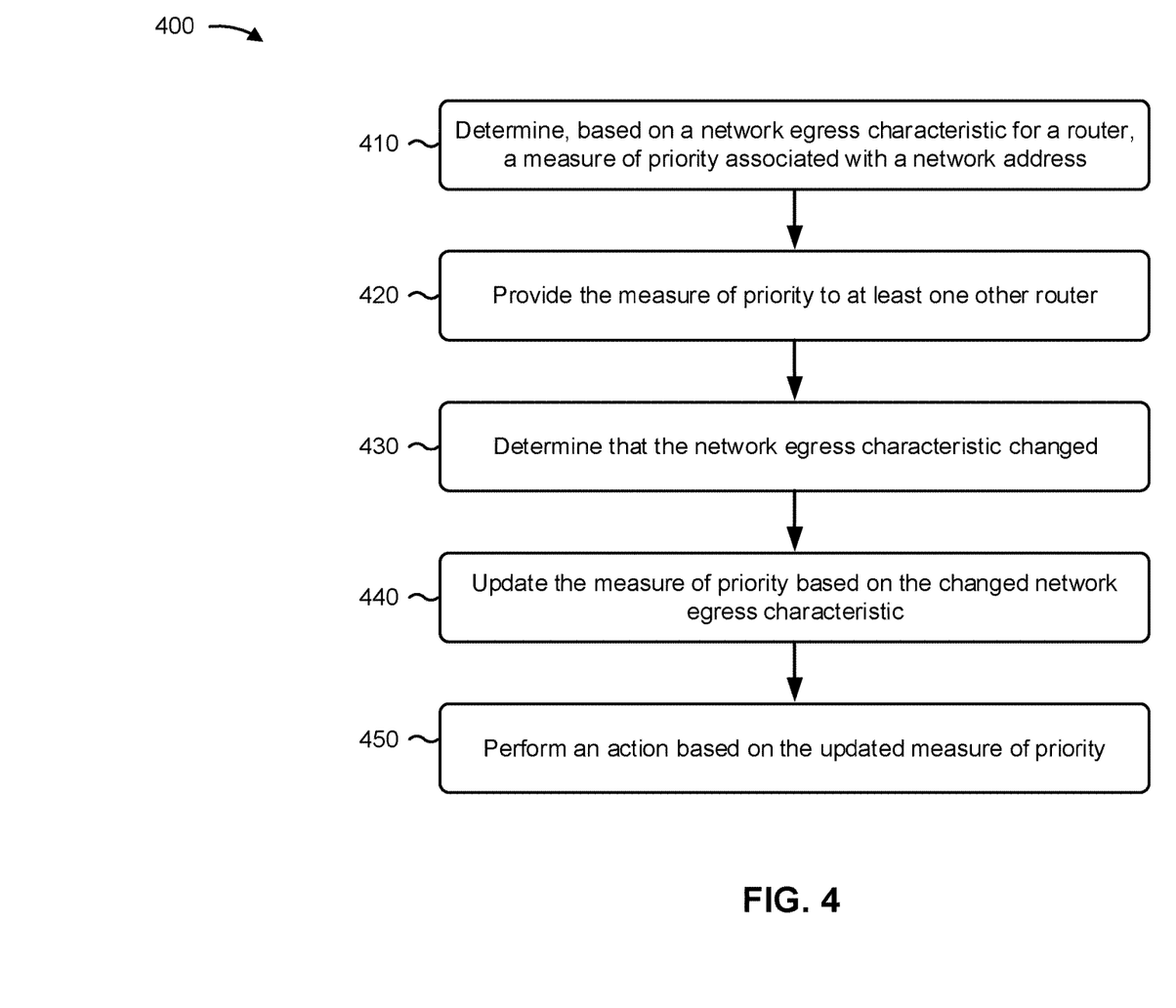
FIG. 4 is a flow chart of an example process for performing network routing based on priority.

FIG. 4 is a flow chart of an example process 400 for performing network routing based on priority. In some implementations, one or more process blocks of FIG. 4 may be performed by routing device 230. In some implementations, one or more process blocks of FIG. 4 may be performed by another device or a group of devices separate from or including routing device 230, such as host device(s) 210 and L2 switch 220.

As shown in FIG. 4, process 400 may include determining, based on a network egress characteristic for a routing device, a measure of priority associated with a network address (block 410). For example, routing device 230 may determine, based on a network egress characteristic of routing device 230, a measure of priority associated with a virtual gateway IP address that is used by a set of host device(s) 210. A network egress characteristic may include, for example, one or more characteristics of a routing device interface (e.g., an interface type, operational status, number, capacity, throughput, available bandwidth, and/or the like) and/or one or more characteristics of a route to network 240 (e.g., route status, operational status, throughput, available bandwidth, and/or the like). The network address may be associated with, for example, one or more host device(s) 210 that have, as their default gateway to network 240, the network address (e.g., a virtual gateway IP address and/or MAC address) for which priority is determined. The determination may be made at any time, including being periodically determined and/or based on the occurrence of an event (e.g., based on routing device 230 being activated, routing device 230 detecting a change in network conditions, routing device 230 receiving priority data from another routing device, and/or the like).

In some implementations, the measure of priority may have a variety of forms, and may include any metric that enables priority to be compared to determine which routing device 230 has greater priority associated with a given network address, measured on any appropriate scale. For example, the metric may be a decimal number (e.g., from 0.0 to 1.0), an integer number (e.g., from 0 to 10 or from 0 to 100), a letter grade (e.g., from A to F or from A to Z), a color code (e.g., from green to amber to red), and/or the like. In some implementations, VRRP priority may be used, which may result in the use of integer values between 0 and 255, for example.

In some implementations, the measure of priority may be determined (e.g., by routing device 230) in a variety of ways, and/or based on a variety of characteristics. For example, predetermined priority values may be used for particular situations, events, or network egress characteristics. As a specific example using default values on a 0 to 255 integer scale, priority may be 0 for a routing device 230 that has no connectivity to network 240, and priority may be 255 for a routing device 230 that is the owner of the network address (e.g., the routing device 230 having the network address as the routing device's physical network address) and that has connectivity to a WAN without any problems. As another example, a routing device with no connectivity to network 240, through any interface and/or route, may use a priority of 0. Priority values between 0 and 255, using the foregoing example numbers, may be determined in a variety of ways and based on other network egress characteristics. For example, a portion of bandwidth being used, an average latency value, a number of WAN interfaces and/or WAN links, or any combination of the foregoing and other egress characteristics, may be used to determine a priority value. By way of example, a default value may be modified based on a measure of average latency (e.g., an average latency value may be subtracted from a default value of 255 to obtain a measure of priority for network traffic that uses the corresponding network address).

In some implementations, a routing device 230 may have multiple egress interfaces to network 240 and/or multiple egress routes to network 240, and each interface and/or route may be associated with a priority value. In this case, priority may be determined based on a formula, such as a sum of priority values of each interface and/or route, or the like.

In some implementations, routing device 230 may generate a mapping table to track egress interfaces and routes for a virtual gateway address. Tracking egress interfaces and routes may facilitate determining priority values for a network address. For example, routing device 230 may identify the virtual gateway address included in a network packet received from host device(s) 210, determine the egress interface and/or route used to forward the network packet to network 240, and store a mapping of the virtual gateway address to information identifying the egress interface and/or route. The mapping indicates, for the virtual gateway address, the interface(s) and route(s) to use to forward network traffic to network 240. Additionally, or alternatively, the mapping table may be used to store other egress characteristics, such as capacity, bandwidth, usage data, etc. for the interface(s) and/or route(s). The ability for routing device 230 to automatically determine egress interfaces and routes, and to automatically generate the mapping, enables routing device 230 to identify changes in the state of network egress interfaces and/or routes quickly, which enables automated and relatively quick determinations regarding measure(s) of priority.

In some implementations, routing device 230 may use weights to determine the measure of priority. For example, network egress interface(s) and/or route(s) of routing device 230 may be given a weight based on characteristics of the interface(s) and/or route(s) (e.g., characteristics including status, type, bandwidth, and/or the like). By way of example, in a situation where routing device 230 has two egress routes to network 240, and one egress route has 7 gigabits of bandwidth while the other egress route has 3 gigabits of bandwidth, the 7 gigabit route may be assigned a 70% weight while the 3 gigabit route may be assigned a 30% weight. In some implementations, the corresponding weight may be used to determine the measure of priority. For example, in a situation where the default priority for a particular network address of routing device 230 is 100, if the 3 gigabit route to network 240 is inactive, priority may be 70% of 100, or 70). Further detail regarding how weights may affect priority is provided below.

In some implementations, routing device 230 may determine multiple measures of priority (e.g., one for each virtual gateway address for which routing device 230 is either master or backup). For example, in a situation where routing device 230 is in 10 different VRRP groups that each include a different virtual gateway addresses (e.g., a total of 10 different virtual gateway addresses), routing device 230 may determine a priority for each of the 10 virtual gateway addresses (in some implementations including a mapping table for each virtual gateway address for which routing device 230 is master).

In this way, routing device 230 may determine, based on a network egress characteristic of routing device 230, a measure of priority associated with a network address that is used by a set of host device(s) 210, enabling routing device 230 to provide priority data to other routing devices 230 associated with the network address. In situations where multiple network addresses are used, routing device 230 may determine a measure of priority for each of the network addresses, e.g., in a manner designed to enable routing device 230 to be master and/or backup for each of the network address.

As further shown in FIG. 4, process 400 may include providing the measure of priority to at least one other routing device (block 420). For example, routing device 230 may provide the measure of priority to at least one other routing device 230 that is associated with the virtual gateway address for which the measure of priority was determined. In various implementations, the measure of priority may be provided periodically and/or based on an occurrence of an event (e.g., based on a change in priority, routing device 230 coming online or going offline, and/or the like). In various implementations, the measure of priority may be provided in a variety of ways, such as a protocol data unit (PDU) broadcast to other routing devices 230 and/or L2 switch 220. The measure of priority may be provided, for example, in a manner designed to enable routing devices 230 that receive the measure of priority to determine whether they should be backup or master for the virtual gateway address associated with the measure of priority.

In some implementations, routing device 230 may use VRRP communications to provide the measure of priority to other routing devices 230 in the same VRRP group (e.g., other routing devices 230 that are either master or backup for the virtual gateway address). For example, routing device 230 may use a multicast PDU packet to communicate the measure of priority to the other routing device(s) 230 (e.g., via L2 switch 220). In some implementations, each PDU may include a measure of priority for a single network address. In some implementations, each PDU may include multiple measures of priority for multiple network addresses. In some implementations, routing device may communicate with other routing device(s) 230 and/or L2 switch via a gratuitous address resolution protocol (ARP) request (e.g., to update master/backup status for a VRRP group).

In some implementations, routing device 230 may receive one or more measures of priority from at least one other routing device 230 that is associated with the virtual gateway address. As with the sending of measure of priority from routing device 230, the other routing device may provide the measure of priority periodically and/or based on an event, via a protocol data unit broadcast, and/or the like, in a similar manner to that described above with respect to providing the measure of priority. In some implementations, routing device 230 may store the measures of priority provided by the other routing device(s) 230. For example, as described in further detail below, the other measures of priority may be used to determine whether routing device 230 should be master or backup for the corresponding virtual gateway address.

In this way, routing device 230 may provide the measure of priority to at least one other routing device 230 that is associated with the virtual gateway address for which the measure of priority was determined, providing at least one other routing device 230 with situational awareness regarding the measure of priority for the virtual gateway address, which may facilitate determining which routing device 230 should be master and which routing device(s) 230 should be backup for the virtual gateway address.

As further shown in FIG. 4, process 400 may include determining that the network egress characteristic changed (block 430). For example, routing device 230 may determine that a network egress characteristic (e.g., upon which the measure of priority was based), has changed. In this situation, a network egress interface and/or route may have become disabled, enabled, congested, and/or otherwise changed.

In some implementations, the determination that a network egress characteristic has changed may be made (e.g., by routing device 230) in a variety of ways. For example, routing device 230 may monitor the network egress interface(s) and/or route(s) used by network traffic associated with the virtual gateway address. In some implementations, routing device 230 may update a mapping table based on network traffic received by routing device 230. Information stored in the mapping table may be used to identify a change in a network egress characteristic. For example, the mapping table may be used to determine that network traffic was received by routing device 230, forwarded to network 240 using a particular WAN route, but no responses were received via the particular WAN route. The lack of response may trigger a determination, by routing device 230, that a change has occurred (e.g., the change being a problem with the particular WAN route).

In some implementations, any change in a network egress characteristic may be determined (e.g., by routing device 230) to be a change. In some implementations, thresholds may be used (e.g., by routing device 230) to determine that a change occurred. For example, a threshold amount and/or percentage of bandwidth being used on a particular interface or route may trigger a change in congested status. In some implementations, a threshold may be predetermined (e.g., by routing device 230) and/or based on a characteristic of the interface and/or route. For example, routing device 230 may determine that the interface is normal if the interface is 80% or less congested, and/or that the interface is considered down if 50% of network traffic or more is being lost.

In this way, routing device 230 may determine that a network egress characteristic (e.g., upon which the measure of priority was based) has changed, enabling routing device 230 to determine changes that might cause a change in the measure of priority associated with the network address affected by the changed network egress characteristic.

As further shown in FIG. 4, process 400 may include updating the measure of priority based on the changed network egress characteristic (block 440). For example, routing device 230 may update the measure of priority associated with the virtual gateway address based on the changed network egress characteristic. In a situation where the changed network egress characteristic was a positive change, such as an interface and/or route becoming available, bandwidth increasing, and/or the like, the measure of priority may increase. In a situation where the changed network egress characteristic was a negative change, such as an interface and/or route becoming unavailable, bandwidth decreasing, and/or the like, the measure of priority may decrease.

In some implementations, updating the measure of priority may be performed in a manner similar to the manner in which the measure of priority was determined (e.g., using a method and/or formula based on network egress characteristics). For example, where predetermined priority values are used for particular situations, events, and/or network egress characteristics, the measure of priority may be updated based on a change in the particular situation, event, and/or network egress characteristic. As a specific example, using a 0 to 255 integer scale, priority may be updated to 0 for a routing device 230 having a changed network egress characteristic indicating no connectivity to network 240, and priority may be updated to 255 for a routing device 230 that is the owner of the corresponding network address and which has a changed network egress characteristic indicating normal network connectivity.

In this way, routing device 230 may update the measure of priority associated with the network address based on the changed network egress characteristic, enabling routing device 230 to perform an action based on the updated measure of priority.

As further shown in FIG. 4, process 400 may include performing an action based on the updated measure of priority (block 450). For example, routing device 230 may perform an action based on the updated measure of priority. In some implementations, routing device 230 may perform a variety of actions including, for example, communicating with one or more other routing device(s) 230, becoming master for the virtual gateway address associated with the updated measure of priority, becoming backup for the virtual gateway address associated with the updated measure of priority, and/or the like.

In some implementations, routing device 230 may communicate the updated measure of priority to the one or more other routing device(s) 230. For example, routing device 230 may use VRRP communications to communicate the updated measure of priority to other routing devices 230 in the same VRRP group (e.g., other routing devices 230 that are either master or backup for the virtual gateway address). For example, routing device 230 may use a multicast PDU packet to communicate the updated measure of priority to the other routing device(s) 230 (e.g., via L2 switch 220).

In some implementations, providing an updated measure of priority might cause one of the other routing device(s) 230 to assume a master role for the corresponding virtual gateway address (e.g., in a situation where routing device 230 was the master for a virtual gateway address but the updated priority is less than the priority of another routing device). In some implementations, routing device 230 may switch from a master role for the virtual gateway address to a backup role for the virtual gateway address. For example, routing device 230 may switch from a master role to a backup role for the virtual gateway address in a situation where the corresponding priority was reduced and routing device 230 determines that another routing device has higher priority (e.g., based on the other routing device's communications regarding priority).

In some implementations, routing device 230 may switch from a backup role for the virtual gateway address to a master role for the virtual gateway address. For example, routing device 230 may switch from a backup role to a master role in a situation where the priority was increased and routing device 230 determines that routing device 230 has higher priority than any other routing device in the VRRP group associated with the virtual gateway address (e.g., based on the other routing device's communications regarding priority).

In some implementations, routing device 230 may assume a master role, or relinquish a master role, in a variety of ways. For example, routing device 230 may communicate with one or more of the other routing devices 230 to indicate the change in priority, which may cause one of the other routing devices 230 with a higher priority to assume master role for the virtual gateway address. Routing device 230 may communicate, for example, using VRRP (e.g., multicast to the other routing devices in a PDU using L2 switch 220).

In some implementations, the action may include notifying a third party regarding the change in priority. For example, routing device 230 may notify a system administrator of the change in priority. This may be performed, for example, in a manner designed to enable a third party to be aware of a potential problem and/or be aware of a change in the state of the network.

In this way, routing device 230 may perform an action based on the updated measure of priority.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The ability to adjust routing device priority based on network egress characteristics of the WAN side of routing device 230 may enable the devices operating on a network to provide improved handling of network traffic, which may lead to a reduction in dropped network traffic in situations where a WAN-side interface and/or route encounters a problem. In some implementations, the automated generation of a mapping table may improve the speed at which changes in network egress interfaces and/or routes are detected and handled (e.g., relative to having personnel determine a mapping). In addition, the improved network traffic handling may enable more efficient use of network resources by transferring responsibility for forwarding network traffic to routing devices 230 with network egress characteristics that might be better suited to handle the network traffic (e.g., to routing devices 230 with a higher priority based on available WAN interface(s) and/or route(s), available bandwidth of routing devices 230, and/or the like).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, including,
   one or more memories; and
   one or more processors, communicatively coupled to the one or more memories, to:
      determine, based on a network egress characteristic associated with the network device, a first measure of priority that corresponds to a first network address,
         the first network address being a gateway network address for which the network device is capable of forwarding network traffic;
      provide the first measure of priority to at least one router;
      receive, from a first router of the at least one router, a second measure of priority associated with the first network address;
      communicate, to another network device and based on the first measure of priority and the second measure of priority, data indicating that the network device is responsible for handling network traffic associated with the first network address,
         the other network device being different from the first router;
      determine, based on a second network egress characteristic associated with the network device, a third measure of priority associated with a second network address,
         the second network address being another gateway network address for which the network device is capable of forwarding network traffic;
      receive, from a second router of the at least one router, a fourth measure of priority associated with the second network address; and
      communicate, to the other network device and based on the third measure of priority and the fourth measure of priority, that the network device is responsible for handling network traffic associated with the second network address.

2. The network device of claim 1, wherein the network device forwards network traffic associated with the gateway network address.

3. The network device of claim 1, wherein the network device and the at least one router are included in a virtual router redundancy protocol (VRRP) group that is responsible for forwarding network traffic associated with the gateway network address.

4. The network device of claim 3, where the one or more processors, when providing the first measure of priority to the at least one router, are further to:
   provide the first measure of priority to the at least one router using a VRRP communication.

5. The network device of claim 1, wherein the network egress characteristic includes one of:
   a measure of wide area network (WAN) egress interface throughput;
   a measure of WAN egress interface bandwidth;
   a measure of WAN egress interface latency;
   a WAN egress interface operational status;
   a measure of WAN egress route throughput;
   a measure of WAN egress route bandwidth;
   a measure of WAN egress route latency; or
   a WAN egress route operational status.

6. The network device of claim 1, where the one or more processors, when determining the first measure of priority, are further to:
   identify a default measure of priority for the gateway network address based on determining that the gateway network address matches a physical network address associated with the network device.

7. The network device of claim 6, where the one or more processors, when determining the first measure of priority, are further to:
   adjust the default measure of priority for the gateway network address based on the network egress characteristic.

8. A non-transitory computer-readable medium storing instructions, the instructions comprising:
   one or more instructions that, when executed by one or more processors of a network device, cause the one or more processors to:
      determine, based on a network egress characteristic associated with the network device, a first measure of priority that corresponds to a first network address,
         the first network address being a gateway network address for which the network device is capable of forwarding network traffic;
      provide the first measure of priority to at least one router;
      receive, from a first router of the at least one router, a second measure of priority associated with the first network address;
      communicate, to another network device and based on the first measure of priority and the second measure of priority, data indicating that the network device is responsible for handling network traffic associated with the first network address,
         the other network device being different from the first router;
      determine, based on a second network egress characteristic associated with the network device, a third measure of priority associated with a second network address,
         the second network address being another gateway network address for which the network device is capable of forwarding network traffic;
      receive, from a second router of the at least one router, a fourth measure of priority associated with the second network address; and communicate, to the other network device and based on the third measure of priority and the fourth measure of priority, that the network device is responsible for handling network traffic associated with the second network address.

9. The non-transitory computer-readable medium of claim 8, wherein the network device forwards network traffic associated with the gateway network address.

10. The non-transitory computer-readable medium of claim 8, wherein the network device and the at least one router are virtual routers included in a virtual router redundancy protocol (VRRP) group.

11. The non-transitory computer-readable medium of claim 8, where the one or more instructions, when executed by the one or more processors, further cause the one or more processors to:
generate a mapping table mapping that specifies, for the gateway network address, a wide area network (WAN) interface for the network egress characteristic.

12. The non-transitory computer-readable medium of claim 11, where the one or more instructions, that cause the one or more processors to determine the first measure of priority, further cause the one or more processors to:
determine the first measure of priority based on the mapping table.

13. The non-transitory computer-readable medium of claim 8, wherein the network egress characteristic includes at least one of:
a measure of wide area network (WAN) egress interface throughput;
a measure of WAN egress interface bandwidth;
a measure of WAN egress interface latency;
a WAN egress interface operational status;
a measure of WAN egress route throughput;
a measure of WAN egress route bandwidth;
a measure of WAN egress route latency; or
a WAN egress route operational status.

14. A method, comprising:
determining, by a network device and based on a network egress characteristic associated with the network device, a first measure of priority that corresponds to a first network address,
the first network address being a gateway network address for which the network device is capable of forwarding network traffic;
providing, by the network device, the first measure of priority to at least one router;
receiving, by the network device and from a first router of the at least one router, a second measure of priority associated with the first network address;
communicating, by the network device and to another network device and based on the first measure of priority and the second measure of priority, data indicating that the network device is responsible for handling network traffic associated with the first network address,
the other network device being different from the first router;
determining, by the network device and based on a second network egress characteristic associated with the network device, a third measure of priority associated with a second network address,
the second network address being another gateway network address for which the network device is capable of forwarding network traffic;
receiving, by the network device and from a second router of the at least one router, a fourth measure of priority associated with the second network address; and
communicating, by the network device and to the other network device and based on the third measure of priority and the fourth measure of priority, that the network device is responsible for handling network traffic associated with the second network address.

15. The method of claim 14, further comprising:
determining that the network egress characteristic has changed;
updating the first measure of priority based on determining that the network egress characteristic has changed; and
providing the updated first measure of priority to the at least one router.

16. The method of claim 14, further comprising:
determining that the network egress characteristic has changed;
updating the first measure of priority based on determining that the network egress characteristic has changed; and
communicating, to the other network device and based on the updated first measure of priority and the second measure of priority, that the network device is no longer responsible for handling network traffic associated with the first network address.

17. The method of claim 14, further comprising:
communicating, to the at least one router, data indicating that the network device is not responsible for handling network traffic associated with the first network address.

18. The method of claim 14, wherein the other network device is an L2 Switch.

19. The method of claim 14, wherein the network egress characteristic includes at least one of:
a measure of wide area network (WAN) egress interface throughput;
a measure of WAN egress interface bandwidth;
a measure of WAN egress interface latency;
a WAN egress interface operational status;
a measure of WAN egress route throughput;
a measure of WAN egress route bandwidth;
a measure of WAN egress route latency; or
a WAN egress route operational status.

20. The method of claim 14, wherein determining the first measure of priority comprises:
identifying a default measure of priority for the gateway network address based on determining that the gateway network address matches a physical network address associated with the network device; and
determining the first measure of priority based on the default measure of priority.

* * * * *